(12) United States Patent
Jeong et al.

(10) Patent No.: US 11,044,456 B2
(45) Date of Patent: Jun. 22, 2021

(54) IMAGE PROCESSING METHOD AND IMAGE PLAYER USING THEREOF

(71) Applicant: Electronics and Telecommunications Research Institute, Daejeon (KR)

(72) Inventors: Jun Young Jeong, Seoul (KR); Kug Jin Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/428,549

(22) Filed: May 31, 2019

(65) Prior Publication Data

US 2019/0373243 A1    Dec. 5, 2019

(30) Foreign Application Priority Data

May 31, 2018  (KR) .......................... 10-2018-0063059
May 30, 2019  (KR) .......................... 10-2019-0063678

(51) Int. Cl.

| | |
|---|---|
| *H04N 13/183* | (2018.01) |
| *H04N 13/178* | (2018.01) |
| *H04N 13/282* | (2018.01) |
| *H04N 13/161* | (2018.01) |
| *H04N 13/271* | (2018.01) |

(52) U.S. Cl.
CPC ......... *H04N 13/183* (2018.05); *H04N 13/161* (2018.05); *H04N 13/178* (2018.05); *H04N 13/271* (2018.05); *H04N 13/282* (2018.05)

(58) Field of Classification Search
None
See application file for complete search history.

(56) References Cited

U.S. PATENT DOCUMENTS

| | | | |
|---|---|---|---|
| 2011/0280552 A1* | 11/2011 | Ikeuchi | H04N 19/597 386/343 |
| 2012/0050325 A1 | 3/2012 | Joo et al. | |
| 2014/0375764 A1* | 12/2014 | Choe | H04N 13/161 348/43 |
| 2015/0138235 A1 | 5/2015 | Cho et al. | |
| 2018/0376125 A1* | 12/2018 | Wang | H04N 13/161 |
| 2019/0037278 A1* | 1/2019 | Ahonen | H04N 21/42653 |
| 2019/0379876 A1* | 12/2019 | Hur | H04N 13/178 |

FOREIGN PATENT DOCUMENTS

| | | |
|---|---|---|
| KR | 1020170123667 A | 11/2017 |
| WO | 2016191467 A1 | 12/2016 |

* cited by examiner

*Primary Examiner* — Clifford Hilaire
(74) *Attorney, Agent, or Firm* — William Park & Associates Ltd.

(57) ABSTRACT

Disclosed are a method and a player for outputting an overlay that displays additional information on a 360-degree video. According to the present invention, an image processing method includes: decoding an overlay; and rendering the decoded overlay on a 360-degree video on the basis of overlay-related information. Here, the overlay-related information includes information indicating the number of the overlays and information indicating a unique identifier assigned to the overlay, and when multiple overlays are present, the identifiers assigned to the respective multiple overlays differ.

8 Claims, 3 Drawing Sheets

IMAGE PROCESSING METHOD AND IMAGE PLAYER USING THEREOF

CROSS REFERENCE TO RELATED APPLICATION

The present application claims priority to Korean Patent Application No. 10-2018-0063059, filed May 31, 2018, and Korean Patent Application No. 10-2019-0063678, filed May 30, 2019 the entire contents of which are incorporated herein for all purposes by this reference.

BACKGROUND OF THE INVENTION

Field of the Invention

The present invention relates generally to a method and a player for outputting an overlay that displays additional information on a 360-degree video.

Description of the Related Art

A video that has rotational degrees of freedom with respect to one or more reference axes is defined as a 360-degree video. In other words, the 360-degree video has the rotational degree of freedom with respect to at least one among yaw, roll, and pitch. The 360-degree video contains a considerable amount of image information compared to a 2D video, so that the file size also increases remarkably. Thus, it is expected that a video service for remotely playing or streaming the 360-degree video stored in a remote location is more popular than a video service for storing the 360-degree video in a local device. Therefore, discussions on a method of processing the 360-degree video on the basis of a network have been widely conducted.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a method and a device for rendering an overlay on a 360-degree video.

The present invention proposes a detailed structure of overlay-related metadata for rendering an overlay on a 360-degree video.

The present invention proposes various types of overlay-related information for rendering an overlay on a 360-degree video.

It is to be understood that technical problems to be solved by the present invention are not limited to the aforementioned technical problems and other technical problems which are not mentioned will be apparent from the following description to a person with ordinary skill in the art to which the present invention pertains.

In order to achieve the above object, there are provided an image processing method and an image player, the method including: decoding an overlay; and rendering the decoded overlay on a 360-degree video on the basis of overlay-related information. Here, the overlay-related information may include information indicating the number of the overlays and information indicating a unique identifier assigned to the overlay, and when multiple overlays are present, the identifiers assigned to the respective multiple overlays differ.

In the image processing method and the image player according to the present invention, the overlay-related information may include region information for determining at least one among a size and a position of a region in which the overlay is rendered.

In the image processing method and the image player according to the present invention, the region information may include at least one among size information indicating the size of the region compared to a size of a current viewport, and position information indicating the position of the region within the current viewport.

In the image processing method and the image player according to the present invention, the overlay-related information may include information indicating priority of the overlay.

In the image processing method and the image player according to the present invention, whether to decode the overlay may be determined on the basis of the priority.

In the image processing method and the image player according to the present invention, the overlay-related information may include depth information indicating a depth of a region in which the overlay is rendered.

In the image processing method and the image player according to the present invention, the depth information may indicate a distance from a surface of a sphere to the region or a distance from a center point of the sphere to the region.

It is to be understood that the foregoing summarized features are exemplary aspects of the following detailed description of the present invention without limiting the scope of the present invention.

According to the present invention, it is possible to provide a method and a device for rendering an overlay on a 360-degree video.

According to the present invention, it is possible to effectively render an overlay on a 360-degree video by using overlay-related metadata.

According to the present invention, it is possible to control output of an overlay on the basis of various types of overlay-related information.

Effects that may be obtained from the present invention will not be limited to only the above described effects. In addition, other effects which are not described herein will become apparent to those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
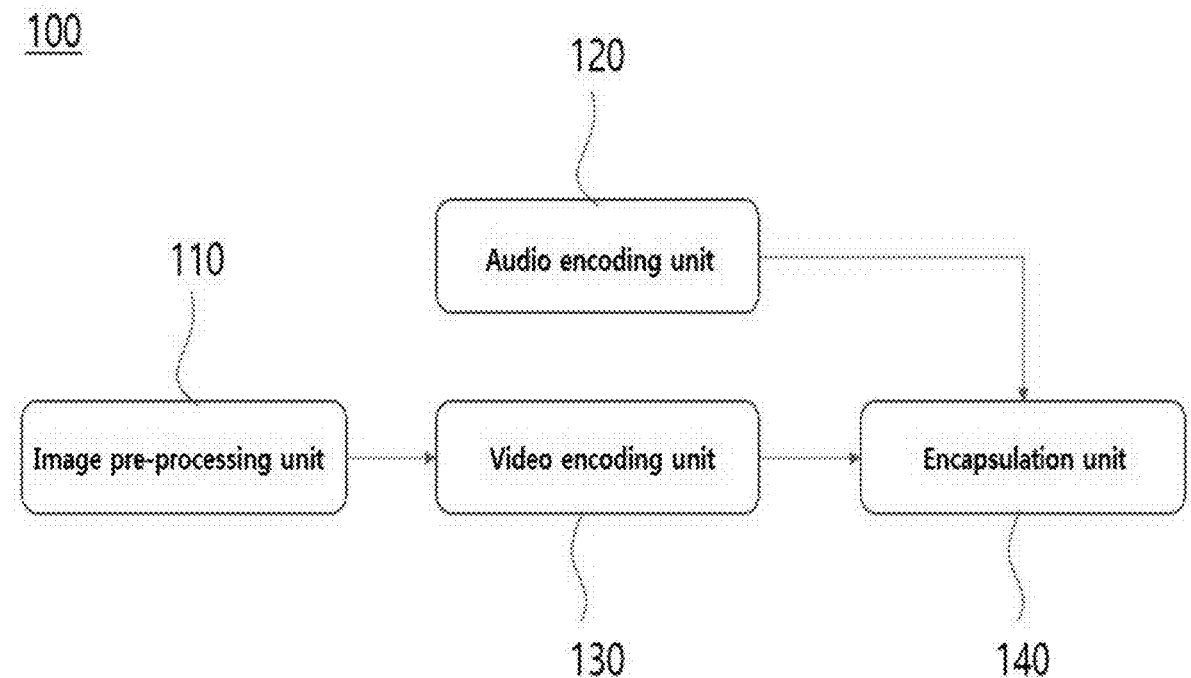
FIG. 1 is a block diagram illustrating a content generation device according to an embodiment of the present invention.

Hereinbelow, exemplary embodiments of the present disclosure will be described in detail such that the ordinarily skilled in the art would easily understand and implement an apparatus and a method provided by the present disclosure in conjunction with the accompanying drawings. However, the present disclosure may be embodied in various forms and the scope of the present disclosure should not be construed as being limited to the exemplary embodiments. In describing embodiments of the present disclosure, well-known functions or constructions will not be described in detail when they may obscure the spirit of the present disclosure. Further, parts not related to description of the present disclosure are not shown in the drawings and like reference numerals are given to like components.

In the present disclosure, it will be understood that when an element is referred to as being "connected to", "coupled to", or "combined with" another element, it can be directly connected or coupled to or combined with the another element or intervening elements may be present therebetween. It will be further understood that the terms "comprises", "includes", "have", etc. when used in the present disclosure specify the presence of stated features, integers, steps, operations, elements, components, and/or combinations thereof but do not preclude the presence or addition of one or more other features, integers, steps, operations, elements, components, and/or combinations thereof.

It will be understood that, although the terms "first", "second", etc. may be used herein to describe various elements, these elements should not be limited by these terms. These terms are only used to distinguish one element from another element and not used to show order or priority among elements. For instance, a first element discussed below could be termed a second element without departing from the teachings of the present disclosure. Similarly, the second element could also be termed as the first element.

In the present disclosure, distinguished elements are termed to clearly describe features of various elements and do not mean that the elements are physically separated from each other. That is, a plurality of distinguished elements may be combined into a single hardware unit or a single software unit, and conversely one element may be implemented by a plurality of hardware units or software units. Accordingly, although not specifically stated, an integrated form of various elements or separated forms of one element may fall within the scope of the present disclosure.

In the present disclosure, all of the constituent elements described in various embodiments should not be construed as being essential elements but some of the constituent elements may be optional elements. Accordingly, embodiments configured by respective subsets of constituent elements in a certain embodiment also may fall within the scope of the present disclosure. In addition, embodiments configured by adding one or more elements to various elements also may fall within the scope of the present disclosure. Hereinbelow, exemplary embodiments of the present disclosure will be described in detail with reference to the accompanying drawings. Throughout the drawings, the same reference numerals will refer to the same or like parts.

A content generation device and a content playing device described in the present invention refer to a device for performing data processing related to a 360-degree video.

FIG. 1 is a block diagram illustrating a content generation device according to an embodiment of the present invention.

Referring to FIG. 1, the content generation device 100 includes an image pre-processing unit 110, an audio encoding unit 120, a video encoding unit 130, and an encapsulation unit 140.

When an audio-video of the real world is captured by an audio sensor and a camera device, a video signal and an audio signal are input to the content generation device 100. The camera device is for shooting a 360-degree video, and the 360-degree video covers all directions around the center point. To generate the 360-degree video, the video signal contains multiple images in multiple directions.

The image pre-processing unit 110 generates a 2D image for performing video encoding by the video encoding unit 120. Specifically, the image pre-processing unit 110 stitches multiple images and projects the stitched images on a sphere. Then, the image pre-processing unit 110 spreads, on the basis of projection formats, image data in the shape of the sphere out in two dimensions to generate a projected picture. The projection formats include at least one among Equirectangular projection, Cubemap projection, Truncated Pyramid Projection (TPP), and Segmented Sphere Projection (SSP).

The image pre-processing unit 110 transforms the projected picture into a packed picture. The packed picture is image data in a quadrangular shape. In order to transform the projected picture to the packed picture, the image pre-processing unit 110 divides the projected picture into one or more faces. At least one among the number of faces, the shape, and the size is determined on the basis of the projection format. Then, the image pre-processing unit 110 transforms the projected picture into the packed picture through region-wise packing. The region-wise packing involves at least one among resizing, warping, and rearranging of the faces. When the region-wise packing is not performed, the image pre-processing unit 110 sets the packed picture to be the same as the projected picture.

The projected picture covers the entire region of the sphere, but the above limitation does not apply to the packed picture. For example, the packed picture covering only a partial region of the sphere is generated from the projected picture.

Further, the above-described image pre-processing is performed repeatedly on the same source image. The image pre-processing is performed multiple times on the same source image so that multiple packed pictures are generated. Here, the regions on the sphere that the multiple packed pictures cover respectively are different from each other.

The image pre-processing unit 110 generates metadata related to the projected picture or the packed picture or both. The metadata is used by the content playing device to render the decoded picture into the sphere. The metadata contains at least one among projection format information of the projected picture, sphere surface region information covered by the packed picture, and region-wise packing information.

The audio encoding unit 120 encodes an audio signal. As the result of audio signal encoding, an audio bitstream is output.

The video encoding unit 130 encodes the packed picture. As the result of video signal encoding, a video bitstream is output.

The encapsulation unit 140 synthesizes the audio bitstream and the video bitstream into one media file according to a particular media container file. Alternatively, the encapsulation unit 140 configures an audio file and a video file into a segment sequence for streaming according to a particular media container file format. The media container file format is ISO base media file format (BMFF). The file or the segment contains metadata for 3D rendering of the decoded picture.

Figure 2:
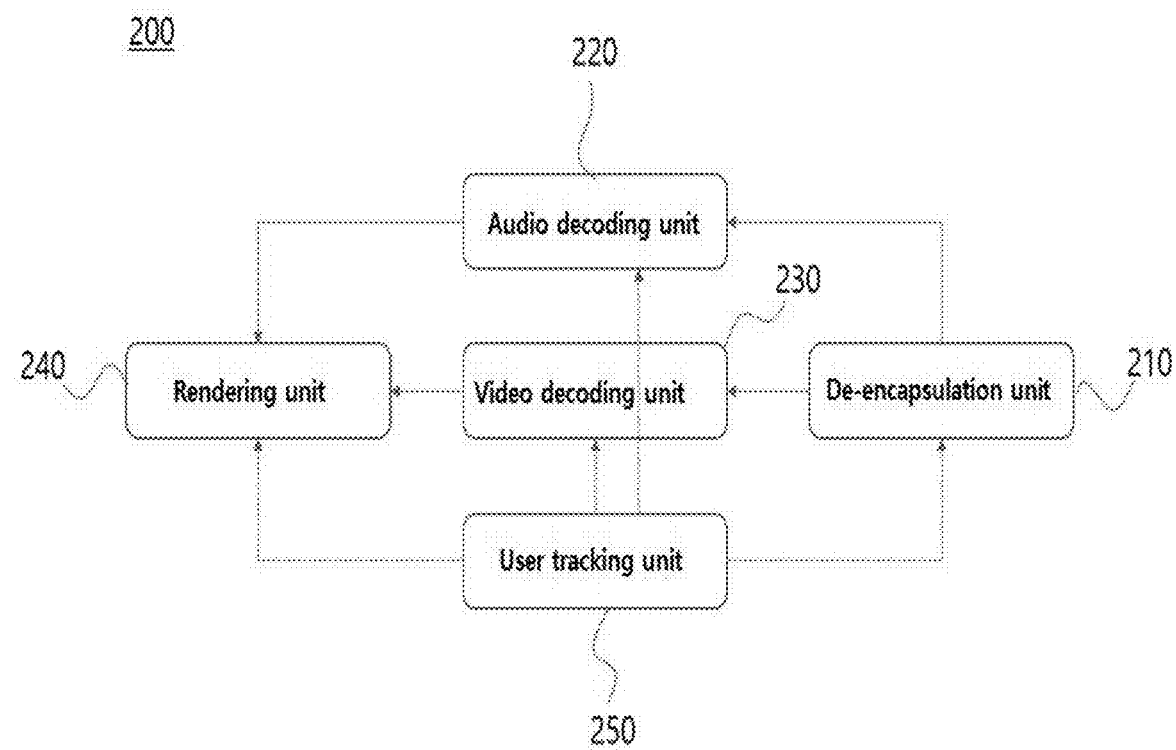
FIG. 2 is a block diagram illustrating a content playing device according to an embodiment of the present invention.

FIG. 2 is a block diagram illustrating a content playing device according to an embodiment of the present invention. The content playing device is a terminal device such as a head-mounted display (HMD), a smartphone, a laptop, a tablet, a PC, a wearable device, or a TV.

Referring to FIG. 2, the content playing device 200 includes a de-encapsulation unit 210, an audio decoding unit 220, a video decoding unit 230, a rendering unit 240, and a user tracking unit 250.

The de-encapsulation unit 210 extracts the audio bitstream and the video bitstream from the media file or the segment sequence received from the content generation device. Also, the de-encapsulation unit 210 parses the metadata for 3D rendering of the decoded picture from the media file or the segment.

The tracking unit determines the viewing direction of the user and generates metadata indicating the viewing direction. The tracking unit determines the viewing direction on the basis of head tracking or eye tracking.

The audio decoding unit 220 decodes the audio bitstream. As the result of the decoding of the audio bitstream, a decoded audio signal is output.

The video decoding unit 230 decodes the video bitstream. As the result of the decoding of the video bitstream, a decoded picture is output.

The video bitstream contains a plurality of subpicture bitstreams or a plurality of tracks. To render the portion that matches the current viewing direction, the video decoding unit 230 uses information indicating the current viewing direction. For example, the video decoding unit 230 decodes, among the video bitstreams, at least one subpicture bitstream including the viewport depending on the current viewing direction or at least one track including the viewport depending on the current viewing direction.

The rendering unit 240 transforms the decoded picture into the 360-degree image on the basis of at least one among the metadata indicating the viewing direction or the viewport and the metadata parsed from the file or the segment. Also, the rendering unit 240 renders the audio signal decoded depending on the current viewing direction.

Figure 3:
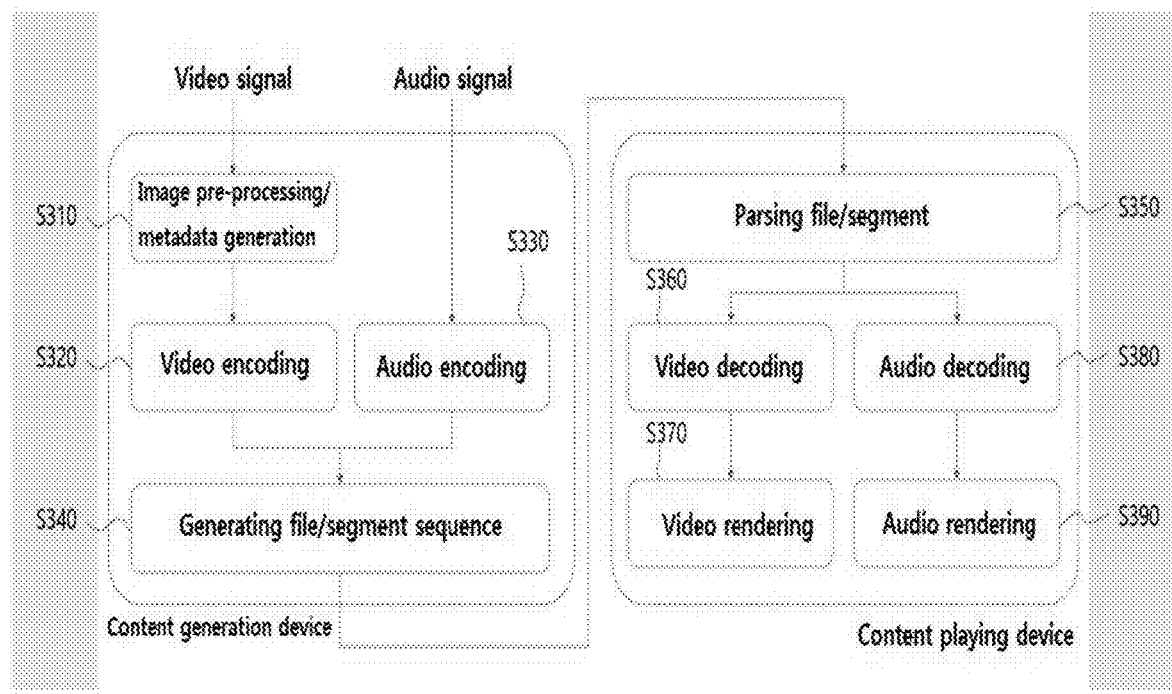
FIG. 3 is a flowchart illustrating a data processing process according to an embodiment of the present invention.

FIG. 3 is a flowchart illustrating a data processing process according to an embodiment of the present invention. The left of FIG. 3 shows the data processing process in the content generation device, and the right of FIG. 3 shows the data processing process in the content playing device.

When the video signal is input to the content generation device, the image pre-processing unit performs image pre-processing for inputting the input video signal into the video encoding unit at step S310. The image pre-processing involves at least one process among image stitching, rotating, projecting, and region-wise packing. Through the image pre-processing process, the projected image and the packed image are generated and information related to the generation of the projected image and the packed image is generated as metadata. Then, video encoding is performed on the packed image at step S320.

When the audio signal is input to the content generation device, the audio encoding unit encodes the input audio signal at step S330.

When the video bitstream and the audio bitstream are generated, these bitstreams are synthesized to generate a media file at step S340. Alternatively, the media file is divided into segments for streaming to generate a segment sequence. The metadata generated in the image pre-processing process is contained in the media file or the segment.

The video signal and the audio signal are processed in parallel.

When the media file or the segment sequence is received from the content generation device, the content playing device parses the video bitstream, the audio bitstream, and the metadata from the received media file or the received segment sequence at step S350.

The content playing device decodes the parsed video bitstream at step S360. Here, the content playing device determines a decoding target bitstream considering the viewing direction of the user or the current viewport. The content playing device renders the decoded image using the metadata at step S370. In rendering the decoded image, the viewing direction of the user or the current viewport are further considered.

The content playing device decodes the parsed audio bitstream at step S380 and renders the decoded audio at step S390. In rendering the decoded audio, the viewing direction or the user or the current viewport are considered.

To enhance the user experience, a method in which additional information is output on the 360-degree video is considered. For example, on the 360-degree video, a logo, sign language translation, an ERP-based preview window corresponding to the entire 360-degree video region, a guide line for guiding the current viewport on the preview window, and/or a thumbnail of the recommended viewport is output, thereby providing user convenience and enhancing the user viewing experience. As described above, the additional image output on the 360-degree video is defined as an overlay.

Figure 4:
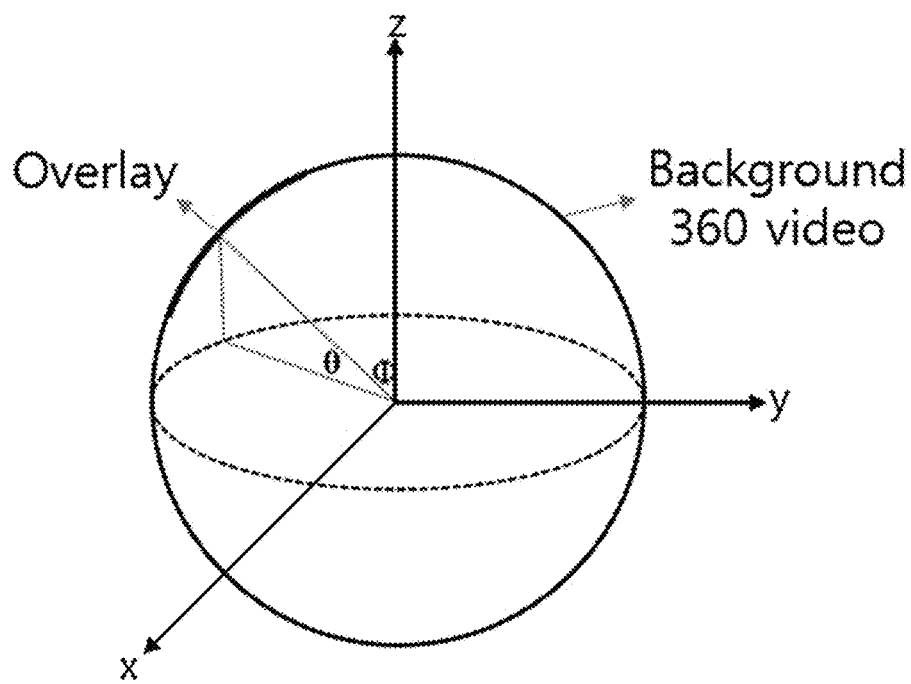
FIG. 4 is a diagram illustrating an aspect in which an overlay is output on a surface of a sphere.

FIG. 4 is a diagram illustrating an aspect in which the overlay is output on the surface of the sphere.

In order to render the overlay on the 360-degree video, overlay-related metadata needs to be defined. When the overlay image is decoded by the video decoding unit, the rendering unit outputs the overlay on the 360-degree video with reference to the overlay-related metadata. Hereinafter, the overlay-related metadata will be described in detail.

The overlay-related metadata contains at least one among the number of overlays, an overlay identifier, overlay region information, overlay depth information, overlay priority, play time point change information, layering order information, transparency, and user interaction information.

The number of overlays indicates whether an overlay is present and the number of overlays when an overlay is present. The overlay-related metadata contains the syntax "num_overlays" for indicating the number of overlays. For example, num_overlays having a value of zero indicates that there is no overlay. When the value of num_overlays is greater than zero, it indicates that there are as many overlays as the value of num_overlays.

The overlay identifier indicates the unique identifier assigned to the overlay. For example, the metadata contains the syntax "overlay_id" for indicating the unique identifier of the overlay. It is impossible to assign the same identifier to two or more overlays. That is, when multiple overlays are present, the identifiers assigned to the respective overlays differ.

Table 1 illustrates a syntax structure for assigning the overlay identifier to the overlay.

TABLE 1

```
aligned(8) class OverlayStruct( ) {
    unsigned int(16) num_overlays;
    unsigned int(8) num_flag_bytes;
    for (i = 0; i < num_overlays; i++)
        unsigned int(8) overlay_id;
        SingleOverlayStruct( );
}
```

The function OverlayStruct indicates the overlay-related metadata. The function SingleOverlayStruct indicates the metadata for a single overlay.

The function OverlayStruct includes the syntax num_overlays. Through num_overlays, it is possible to determine whether an overlay is present and the number of overlays. When multiple overlays are present, an identifier is assigned to each overlay through overlay_id.

In Table 1, as an example, the syntax overlay_id is included in the function OverlayStruct. As another example, in the function SingleOverlayStruct indicating the metadata for a single overlay, the syntax overlay_id is defined.

The overlay region information indicates the position and/or the size of the region in which the overlay is rendered. Through the overlay region information, the output position and/or the size of the overlay on the 360-degree video are determined.

Table 2 illustrates a syntax structure representing the overlay position information.

TABLE 2

```
aligned(8) class OverlayStruct( ) {
    unsigned int(16) num_overlays;
    unsigned int(8) num_flag_bytes;
    for (i = 0; i < num_overlays; i++)
        unsigned int(8) overlay_id;
        SphereRegionStruct( );
        SingleOverlayStruct( );
}
```

As shown in the example in Table 2, the function SphereRegionStruct indicating the region on the sphere covered by the overlay is added to the function OverlayStruct.

When multiple overlays are present, the function SphereRegionStruct is called for each overlay. Thus, the positions of the rendering regions for the multiple overlays are determined individually.

In Table 2, as an example, the function SphereRegionStruct is the subfunction of the function OverlayStruct. As another example, as the subfunction of the function SingleOverlayStruct indicating the metadata for a single overlay, the function SphereRegionStruct is defined.

To determine the position of the region in which the overlay is rendered, the syntax indicating the width and the height of the region is defined. Also, to determine the position of the region in which the overlay is rendered, the syntax indicating the position of the region within the projected picture, the position of the region within the packed picture, or the position of the region within the viewport is defined.

Table 3 and Table 4 illustrate syntax related to the overlay region information.

TABLE 3

```
aligned(8) class SphereRegionStruct( ) {
    unsigned int(32) proj_reg_width;
    unsigned int(32) proj_reg_height;
```

TABLE 3-continued

```
    unsigned int(32) proj_reg_top;
    unsigned int(32) proj_reg_left;
}
```

In Table 3, the syntax proj_reg_width and the syntax proj_reg_height indicate the width and the height of the region in which the overlay is rendered, respectively. The syntax proj_reg_top and the syntax proj_reg_left indicate the top left coordinates of the region in which the overlay is rendered within the projected picture.

As another example, the syntax packed_reg_top and the syntax packed_reg_left are used that indicate the top left coordinates of the region in which the overlay is rendered within the packed picture (namely, the decoded picture).

TABLE 4

```
aligned(8) class SphereRegionStruct( ) {
    unsigned int(16) rect_left_percent;
    unsigned int(16) rect_top_percent;
    unsigned int(16) rect_width_percent;
    unsigned int(16) rect_height_percent;
    unsigned int(1) relative_disparity_flag;
}
```

In Table 4, the syntax rect_left_percent and the syntax rect_top_percent indicate the top left coordinates of the region in which the overlay is rendered. Specifically, the syntax rect_left_percent indicates the ratio of the left coordinate of the region when assuming that the left border of the current viewport is 0% and the right border is 100%. The syntax rect_top_percent indicates the ratio of the top coordinate of the region when assuming that the top border of the current viewport is 0% and the bottom border is 100%. The syntax rect_width_percent indicates the ratio between the width of the current viewport and the width of the region, and the syntax rect_height_percent indicates the ratio between the height of the current viewport and the height of the region.

The overlay priority indicates the priority between overlays. The content playing device determines the decoding order of multiple overlays on the basis of the priority between the overlays. For example, to render the multiple overlays, the content playing device needs to include multiple decoders. However, when the number of decoders included in the content playing device is not enough to decode bitstreams for all the overlays, the content playing device needs to inform which overlay needs to be decoded taking priority. The content playing device determines, on the basis of the information indicating the priority between the overlays, an overlay to be decoded taking priority over other overlays.

Figure 5:
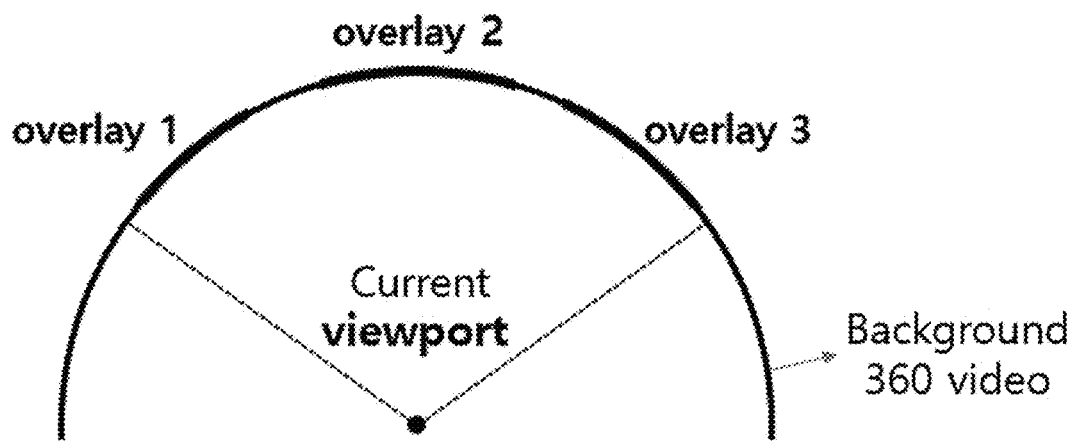
FIG. 5 is a diagram illustrating an example in which decoding order is determined on the basis of overlay priority.

FIG. 5 is a diagram illustrating an example in which the decoding order is determined on the basis of the overlay priority.

When three regions for overlay rendering are included on the viewport of the user, but if there is only one decoder is provided in the content playing device, it is impossible to simultaneously output three overlays on the viewport. The content playing device determines a decoding target on the basis of the priority of the three overlays. That is, the overlay having the highest priority among the three overlays is decoded, and the decoded overly is rendered on the viewport.

Table 5 illustrates a syntax structure representing information indicating the overlay priority.

TABLE 5

```
aligned(8) class OverlayStruct( ) {
    unsigned int(16) num_overlays;
    unsigned int(8) num_flag_bytes;
    for (i = 0; i < num_overlays; i++)
        unsigned int(8) overlay_id;
        unsigned int(8) overlay_priority;
        SphereRegionStrcut( );
        SingleOverlayStruct( );
}
```

As shown in the example in Table 5, the syntax overlay_priority indicating the priority of the overlay is added to the function OverlayStruct. When multiple overlays are present, the syntax overlay_priority is parsed for each overlay.

In Table 5, as an example, the syntax overlay_priority is included in the function OverlayStruct. As another example, in the function SingleOverlayStruct indicating the metadata for a single overlay, the syntax overlay_priority is defined.

It is impossible to assign the same priority to two or more overlays. That is, when multiple overlays are present, the priorities assigned to the respective overlays differ. The overlay_priority having a value of zero represents that it is essential to output the corresponding overlay.

The overlay depth information indicates the depth of the region in which the overlay is rendered. Rather than displaying the overlay image on the surface of the sphere, spacing the region in which the overlay is rendered from the surface of the sphere provides better visibility to the user.

Figure 6:
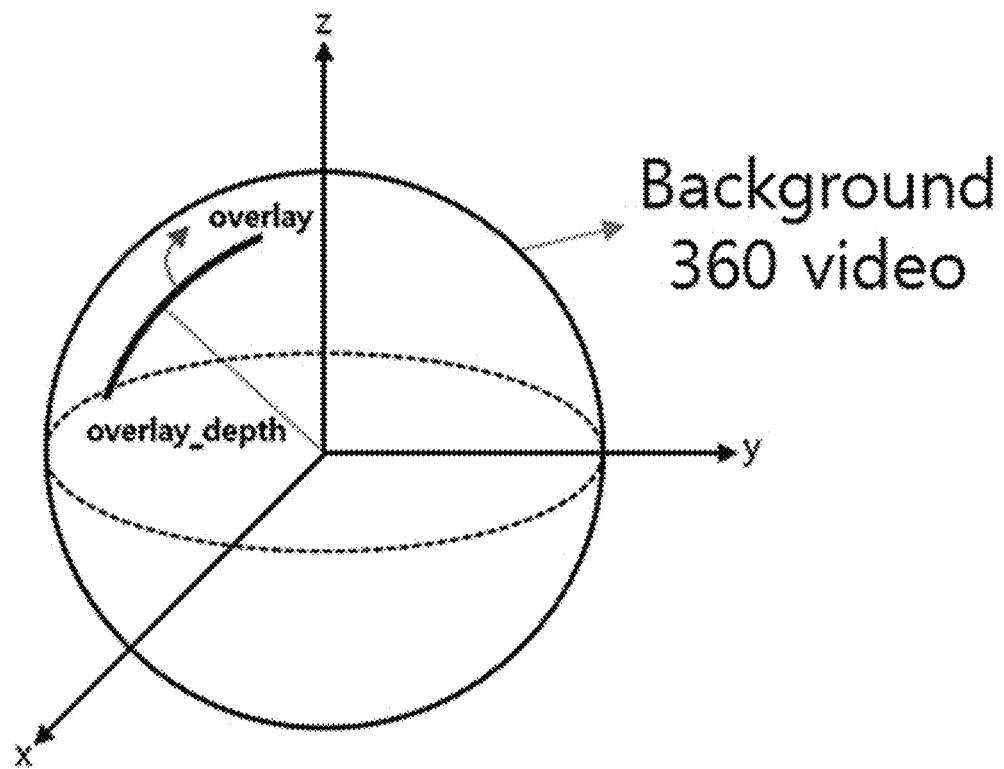
FIG. 6 is a diagram illustrating an example in which a depth of an overlay and a depth of a 360-degree video are set differently.

FIG. 6 is a diagram illustrating an example in which the depth of the overlay and the depth of the 360-degree video are set differently.

The rendering unit determines the depth of the region in which the overlay is output, by using the overlay depth information. The overlay depth information indicates a distance from the center point to the region or a distance from the surface of the sphere to the region.

Table 6 illustrates a syntax structure representing the overlay depth information.

TABLE 6

```
aligned(8) class OverlayDepth( ) {
    unsigned int(8) overlay_depth;
}
```

As shown in the example in Table 6, the syntax overlay_depth indicating the overlay depth is defined. The syntax overlay_depth is included in the function OverlayDepth. The syntax overlay_depth indicates a distance from the center point to the region in which the overlay is rendered or a distance from the surface of the sphere to the region.

The function OverlayDepth is defined as a subfunction of the function OverlayStruct or SingleOverlayStruct.

The play time point change information indicates whether the play time point of the overlay is set differently from that of the 360-degree video. To indicate the above matter, the syntax timeline_chage_flag is defined.

For example, the syntax timeline change flag having a value of one indicates that the play time point of the overlay needs to be set equal to that of the 360-degree video. That is, even though the viewport of the user is out of the overlay and the playing of the overlay is paused, when the viewport of the user returns, the overlay is played from the play time point that is the same as the play time point of the 360-degree video.

Conversely, the syntax timeline change flag having a value of zero indicates that the play time point of the overlay is set differently from that of the 360-degree video. That is, when the viewport of the user is out of the overlay and the playing of the overlay is paused, the overlay is played from the interruption time point regardless of the play time point of the 360-degree video after the viewport of the user returns.

The layering order information indicates the layering order of overlays. The overlay having the layering order of a low value is placed in front, and the overlay having the layering order of a high value is placed behind. To indicate the layering order information, the syntax layering order is defined.

The transparency indicates the transparency of the overlay. To indicate the transparency of the overlay, the syntax opacity is defined. The transparency is represented by a numeral ranging 0 to 100. Numeral 0 indicates a completely transparent state and numeral 100 indicates a completely opaque state.

The user interaction information indicates whether the overlay-related setting is changed by the user input. Here, the overlay-related setting refers to the output position of the overlay, the overlay depth, overlay on/off, the transparency, the overlay size, the overlay layering order, the overlay priority, and the overlay source (or the overlay media). Flags indicating whether the overlay-related setting is changed by the user input are defined.

The above-listed overlay-related information is implemented as a control structure function. The control structure function means a subfunction defined in the metadata for a single overlay (namely, SingleOverlayStruct). Different indexes are assigned to the respective control structure functions, and a flag indicating whether a control structure function is present in the metadata for a single overlay is included.

Table 7 shows an example of index assignment for each control structure.

TABLE 7

| Index | Control structure | Description |
|---|---|---|
| 0 | SphereRegionStruct | Overlay position information |
| 1 | OverlayPriority | Overlay priority |
| 2 | OverlayDepth | Overlay depth information |
| 3 | OverlayTimeline | Play time point change information |
| 4 | OverlayLayeringOrder | Layering order information |
| 5 | OverlayOpacity | Transparency |
| 6 | OverlayInteraction | User interaction information |

Table 8 illustrates a syntax structure representing whether a control structure function is present.

TABLE 8

```
aligned(8) class OverlayStruct( ) {
    unsigned int(16) num_overlays;
    unsigned int(8) num_flag_bytes;
    for (i = 0; i < num_overlays; i++)
        SingleOverlayStruct( );
}
aligned(8) class SingleOverlayStruct( ) {
    unsigned int(16) overlay_id;
    for (i = 0; i < num_flag_bytes * 8; i++)
        unsigned int(1) overlay_control_flag[i];
```

In Table 8, num_flag_bytes indicates the total number of bits assigned to the control structure flags overlay_ control_flag. Whether the control structure function is present is indicated by overlay_control_flag. For example, overlay_control_flag[i] having a value of zero indicates that the control structure function with index i is not present. On the other hand, overlay_control_flag[i] having a value of one indicates that the control structure function with index i is present.

When the value of overlay_cotrol_flag[i] is one, the control structure function corresponding to the i-th index is called and the overlay-related information is obtained.

Further, a flag indicating whether it is essential for the content playing device to parse the control structure function is included in the metadata for a single overlay.

Table 9 illustrates a syntax structure representing whether parsing the control structure function is essential.

TABLE 9

```
aligned(8) class SingleOverlayStruct( ) {
    unsigned int(16) overlay_id;
    for (i = 0; i < num_flag_bytes * 8; i++)
        unsigned int(1) overlay_control_flag[i];
    for (i = 0; i < num_flag_bytes * 8; i++){
        if (overlay_control_flag[i]) {
            unsigned int(1) overlay_control_essential_flag[i];
            unsigned int(15) byte_count[i];
            unsigned int(8) overlay_control_struct[i][byte_count[i]];
        }
    }
}
```

In Table 9, whether it is essential to parse the control structure function is indicated by overlay_control_essential_flag. For example, overlay_control_essential_flag[i] having a value of zero indicates that the content playing device is not required to parse the control structure function with index i. On the other hand, overlay_control_essential_flag[i] having a value of one indicates that the content playing device is required to parse the control structure function with index i.

Although exemplary methods of the present disclosure are described as a series of operation steps for clarity of a description, the present disclosure is not limited to the sequence or order of the operation steps described above. The operation steps may be simultaneously performed, or may be performed sequentially but in different order. In order to implement the method of the present disclosure, additional operation steps may be added and/or existing operation steps may be eliminated or substituted.

Various embodiments of the present disclosure are not presented to describe all of available combinations but are presented to describe only representative combinations. Steps or elements in various embodiments may be separately used or may be used in combination.

In addition, various embodiments of the present disclosure may be embodied in the form of hardware, firmware, software, or a combination thereof. When the present disclosure is embodied in a hardware component, it may be, for example, an application specific integrated circuit (ASIC), a digital signal processor (DSP), a digital signal processing device (DSPD), a programmable logic device (PLD), a field programmable gate array (FPGA), a general processor, a controller, a microcontroller, a microprocessor, etc.

The scope of the present disclosure includes software or machine-executable instructions (for example, operating systems (OS), applications, firmware, programs) that enable methods of various embodiments to be executed in an apparatus or on a computer, and a non-transitory computer-readable medium storing such software or machine-executable instructions so that the software or instructions can be executed in an apparatus or on a computer.

What is claimed is:

1. An image processing method comprising:
   decoding an overlay; and
   rendering the decoded overlay on a 360-degree video on the basis of overlay-related information,
   wherein the overlay-related information includes information based on a first structure for determining a position of a region in which the overlay is rendered and priority information based on a second structure for determining decoding orders between overlays,
   wherein control flags indicating whether control structures of the first structure and the second structure are present or not in a bitstream are signaled via the bitstream, and
   wherein whether each of the first structure and the second structure is present or not is determined based on each of the control flags corresponding to respective indexes assigned to the control structures.

2. The image processing method of claim 1, wherein whether to decode the overlay is determined on the basis of the priority.

3. The image processing method of claim 1, wherein the overlay-related information includes depth information indicating a depth of a region in which the overlay is rendered.

4. The image processing method of claim 3, wherein the depth information indicates a distance from a surface of a sphere to the region or a distance from a center point of the sphere to the region.

5. An image player comprising:
   an image decoding unit decoding an overlay; and
   a rendering unit rendering the decoded overlay on a 360-degree video on the basis of overlay-related information,
   wherein the overlay-related information includes information based on a first structure for determining a position of a region in which the overlay is rendered and priority information based on a second structure for determining decoding orders between overlays,
   wherein control flags indicating whether control structures of the first structure and the second structure are present or not in a bitstream are signaled via the bitstream, and
   wherein whether each of the first structure and the second structure is present or not is determined based on each of the control flags corresponding to respective indexes assigned to the control structures.

6. The image player of claim 5, wherein whether to decode the overlay is determined on the basis of the priority.

7. The image player of claim 5, wherein the overlay-related information includes depth information indicating a depth of a region in which the overlay is rendered.

8. The image player of claim 7, wherein the depth information indicates a distance from a surface of a sphere to the region or a distance from a center point of the sphere to the region.

\* \* \* \* \*